Patented May 15, 1945

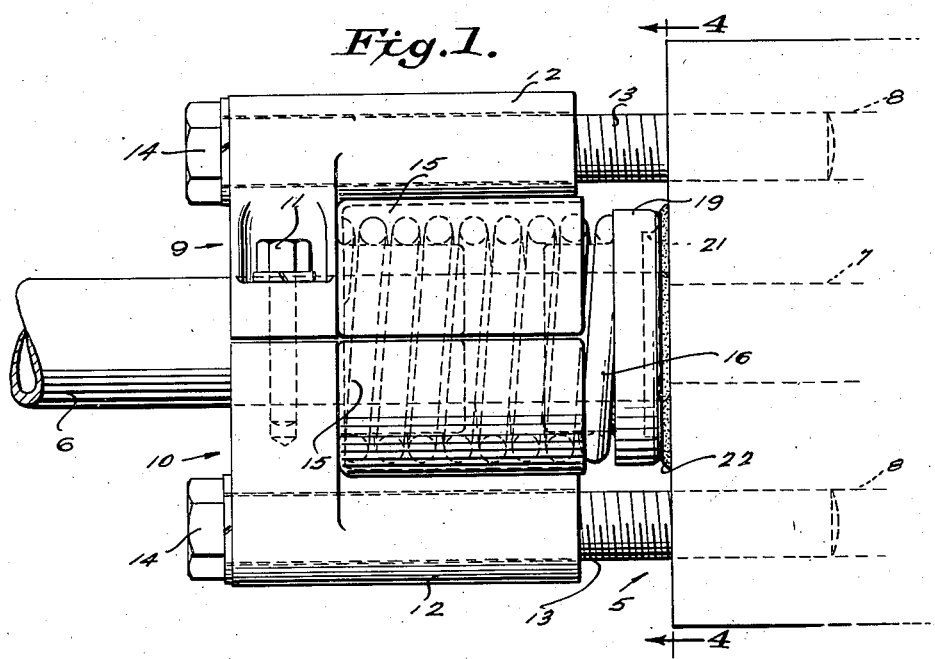
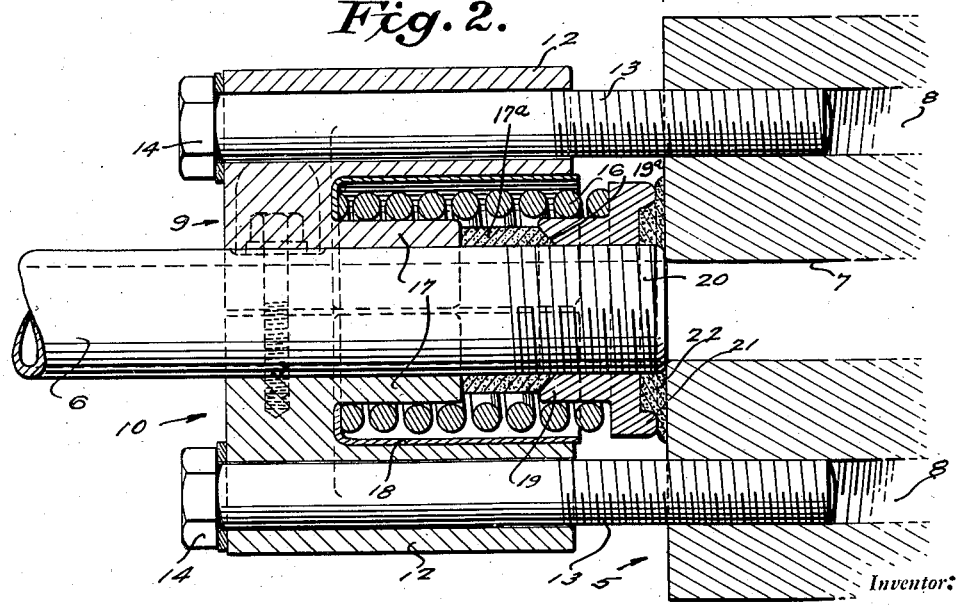

2,376,134

UNITED STATES PATENT OFFICE 2,376,134

AIR PIPE COUPLING AND RETAINING MEANS

William Frank, Silesia, Mont.

Application June 3, 1944, Serial No. 538,659

2 Claims. (Cl. 285—6.5)

This invention relates to pipe couplings in general and has more specific reference to an especially constructed union affording a compensating and safe type connection between an air pressure pipe and a reservoir, particularly the style used in connection with so-called "AB" airbrakes on freight, passenger and equivalent cars.

The present equipment is one in which the air pipe is rigidly threaded into an adapter bracket on the reservoir, the connection being of a fixed type and partly maintained through the aid of a lock or clamping nut.

It has been my observation that this mode of attaching the pipe to the reservoir is entirely too rigid and this accounts for leakages and breakages, particularly at the point of connection between the pipe and reservoir. Confronted with the necessity of saving time, labor, material and expenses in general it is my opinion that the use of a flexible coupling at this point is a highly needed requirement in railroad equipment, particularly the brake structure. In fact, and as above implied, I have evolved and produced a union between the pipe and reservoir which is sufficiently adaptable to compensate for excessive vibrations, whereby to overcome the objections and defects commonly met.

More specifically, and somewhat briefly stated, I provide an arrangement characterized by an adjustable securely mounted follower device or unit, this embracing the pipe-end, said pipe-end being provided with a special collar nut, a gasket interposed between the nut and reservoir, and spring means being arranged between the follower and nut, all of said parts coacting with requisite nicety and serviceability to achieve the desired ends.

In carrying out my aims, I have devised a structural assemblage of parts carefully chosen and coordinated to provide for strength and durability, compensating adaptability, simplicity and other attending factors believed to be appropriate for incorporation in a device of the type classified.

Other features and advantages will become more readily apparent from the following description and the accompanying illustrative drawings.

In the drawings, wherein like numerals are employed to designate like parts throughout the same—

Figure 1 is a side elevational view of a structural assemblage showing the air reservoir, the air pipe, and pipe assembling and coupling means constructed in accordance with the principles of the present invention.

Figure 2 is a view which may be said to be a central longitudinal sectional view through the arrangement depicted in Figure 1.

Figure 3:
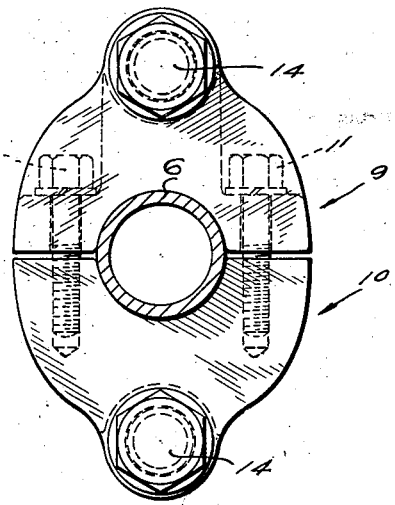
Figure 3 is an end elevation of Figure 1 observing the same in a direction from left to right.
Figure 4:
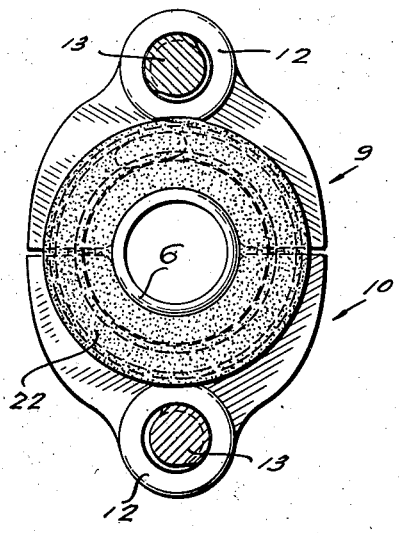
Figure 4 is a section on the plane of the line 4—4 of Figure 1, looking in the direction of the arrows.

Referring now to the drawings by distinguishing reference numerals it will be observed that the conventional reservoir of the air brake system is denoted by the numeral 5 and the air line or pipe is indicated at 6. The pipe lines up with the air passage 7 in Figure 2. On opposite sides of this are existing or standard screwthreaded bores 8.

The follower device or unit is composed of substantially duplicate companion sections 9 and 10 embracing the pipe and bolted together as indicated at the points 11. These sections are provided with tubular guides or sleeves 12 for the bolts 13, whose threaded ends are screwed into the bores 8 and whose headed ends 14 are accessible to accommodate a wrench for tightening purposes. The bores of the sleeves or guides 12 are smooth and the bolts simply pass therethrough and are threaded into the bolt holes 8. The hub portion provided by the coaction of the two sections 9 and 10 forms a receptacle, this being made up of semi-circular coacting parts 15 which when bolted together serve to accommodate the tension spring 16. Semi-circular hub flanges 17 also coact in forming a concentric central bushing or hub which directly surrounds the pipe and one end portion of the spring surrounds said hub. The numeral 18 designates a dust shield or cup which in practice rather snugly surrounds the spring to protect the coils.

A collar nut is denoted at 19 and this is threaded on the screw-threaded end 20 of the pipe and terminates in an outstanding disk-like head 19a formed with a peripheral or marginal rim 21 defining a cup, this for the gasket 22. The gasket surrounds the threaded end of the pipe and is pressed into the cup and pinched against the reservoir and firmly squeezed in place by the rounded marginal edge portions of the rim of the cup.

With the parts as shown in Figure 2, the bolts 11 are sufficiently loosened to permit the follower, made up of the main complemental sections 9 and 10 to slip longitudinally along the pipe. Then, the bolts 13 are tightened into the holes 8 in the reservoir compressing the spring and exerting end thrust pressure on the nut or packing cap 19, thus pressing the packing tightly against its seat and obtaining the desired leak proof union between the pipe and reservoir. After this adjustment is made the bolts 11 are tightened down firmly to secure the sections 9 and 10 in place.

Novelty is predicated on the two parts or sectional follower unit made up of the complemental half sections 9 and 10, these bolted on and embracing the pipe and serving as mounts for the main tightening bolt 14 and also defining a socket for the spring which spring is pressed against the gasket accommodation cup on the threaded end of the air pipe.

Reference being had to Figure 2, I call attention to an extra gasket 17a which may, if desired, be used. This surrounds the pipe 6 with one end firmly abutting the parts 17; the opposite end being bevelled and projecting into a seat 19a formed therefor in the collar nut 19. This gasket is an added safety feature and will prevent the collar 19 from working loose from vibration. Further, it guards against air leaks such as may otherwise occur at this vulnerable point.

Although the invention is stressed to be used between the pressure pipe and reservoir, it is equally well usable on the opposite end of the pipe which connects to the customary A. B. pipe bracket (not shown), as well as the pipe which runs from pipe bracket to the brake cylinder. My claims are to be construed with these variations in mind.

It is thought that persons skilled in the art of which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a structural assemblage of the class described, in combination, a reservoir having an air passage and screw-threaded sockets on diametrically opposite sides thereof, a pipe having a threaded end portion abutting the reservoir and in alignment with said air passage, a collar-nut adjustable on said threaded end of said pipe and having an outstanding annular head formed with an annular bead constituting a rim for the head, a gasket interposed between the collar-nut and adjacent face of the reservoir and having marginal portions compressed by the bead, a follower device embracing the pipe and shiftable thereon toward and from the reservoir and the collar-nut, bolts passing longitudinally through said follower device and threaded into said screw-threaded sockets and having heads at their outer ends, and a coiled spring surrounding the pipe and interposed between the follower device and collar-nut for urging the collar-nut toward the reservoir and compressing the gasket tightly about the pipe.

2. In a structural assemblage of the class described, in combination, a reservoir, an air pipe, said reservoir having an air passage, said pipe having a screw-threaded end portion abutting the reservoir and in alignment with said air passage, a collar threaded on said pipe, said collar having an outstanding circular cup formed with a forwardly projecting bead about its margin having a transversely rounded front edge, a gasket seated in said cup and surrounding the pipe and in contact with the reservoir, said bead bearing against the outer marginal portion of the gasket, a centrally socketed follower device shiftably mounted on said pipe and shiftable along the pipe toward and from the reservoir, a longitudinal sleeve carried by said follower, bolts passing through said sleeve and having heads at their outer ends, said reservoir having bolt holes accommodating said bolts, a hub in said follower fitting snugly about said pipe, a coiled spring in said follower having one end fitting about the hub and abutting the follower, said spring having its other end surrounding the collar and bearing against the cup, and a tubular liner in said follower surrounding said spring and having an internal flange engaged by the inner end of the spring, said follower device being made up of complemental sections bolted together and adapted to be drawn into tight-gripping engagement with said pipe when the last-mentioned bolts are tightened.

WILLIAM FRANK.